United States Patent
Lim et al.

(10) Patent No.: US 10,291,906 B2
(45) Date of Patent: May 14, 2019

(54) STEREOSCOPIC IMAGE DEVICE HAVING IMPROVED BRIGHTNESS AND METHOD FOR PROVIDING STEREOSCOPIC IMAGE

(71) Applicant: RealD Inc., Beverly Hills, CA (US)

(72) Inventors: Byung Gul Lim, Yongin-si (KR); Sung Ho Cho, Seoul (KR); Chul Woo Lee, Seongnam-si (KR)

(73) Assignee: RealD Inc., Beverly Hills, CA (US)

( * ) Notice: Subject to any disclaimer, the term of this patent is extended or adjusted under 35 U.S.C. 154(b) by 172 days.

(21) Appl. No.: 15/038,476

(22) PCT Filed: Dec. 29, 2014

(86) PCT No.: PCT/IB2014/002886
§ 371 (c)(1),
(2) Date: May 23, 2016

(87) PCT Pub. No.: WO2015/092536
PCT Pub. Date: Jun. 25, 2015

(65) Prior Publication Data
US 2016/0301920 A1    Oct. 13, 2016

(30) Foreign Application Priority Data

Dec. 16, 2013  (KR) .................. 10-2013-0156411
Mar. 26, 2014  (WO) ................ PCT/KR2014/002563

(51) Int. Cl.
*H04N 13/337*  (2018.01)
*H04N 13/346*  (2018.01)
(Continued)

(52) U.S. Cl.
CPC ............. *H04N 13/337* (2018.05); *G02B 5/04* (2013.01); *G02B 27/2228* (2013.01);
(Continued)

(58) Field of Classification Search
None
See application file for complete search history.

(56) References Cited

U.S. PATENT DOCUMENTS

| | | | |
|---|---|---|---|
| 5,225,861 A | 7/1993 | Marks | |
| 5,283,600 A | 2/1994 | Imai | |

(Continued)

FOREIGN PATENT DOCUMENTS

| | | | |
|---|---|---|---|
| CN | 101021674 A | 8/2007 | |
| CN | 101408675 A | 4/2009 | |

(Continued)

OTHER PUBLICATIONS

International Search Report and Written Opinion of the International Searching Authority dated Jul. 7, 2015 for Application No. PCT/IB2014/002886.

(Continued)

*Primary Examiner* — Heather R Jones
(74) *Attorney, Agent, or Firm* — Penny L. Lowry; Neil G. Mothew

(57) ABSTRACT

The present invention relates to a stereoscopic image device and a method for providing a stereoscopic image and, more specifically, to a stereoscopic image device and a method capable of providing a stereoscopic image, which can provide high-quality stereoscopic image by using two projectors and devices related thereto. To this end, the present invention provides the stereoscopic image device and the method for providing the stereoscopic image, the device comprising: a first polarizing beam splitter for reflecting, in first and second directions according to polarizing components, the incident light received along a firth path and transmitting the same in a third direction; a first reflection member for reflecting, in a screen direction, the light reflected from the first polarizing beam splitter; a second polarizing beam splitter for reflecting, in the first and second (Continued)

directions according to the polarizing components, the incident light received along a second path and transmitting the same in the third direction; and a second reflection member for reflecting, in the screen direction, the light reflected from the second polarizing beam splitter.

16 Claims, 14 Drawing Sheets

(51) Int. Cl.
*H04N 13/363* (2018.01)
*G02B 5/04* (2006.01)
*G02B 27/22* (2018.01)
*G02B 27/26* (2006.01)

(52) U.S. Cl.
CPC ..... *G02B 27/2235* (2013.01); *G02B 27/2242* (2013.01); *G02B 27/26* (2013.01); *H04N 13/346* (2018.05); *H04N 13/363* (2018.05)

(56) References Cited

U.S. PATENT DOCUMENTS

| | | | |
|---|---|---|---|
| 5,359,455 | A | 10/1994 | Oishi |
| 5,381,278 | A | 1/1995 | Shingaki et al. |
| 5,729,306 | A | 3/1998 | Miyake et al. |
| 5,772,299 | A | 6/1998 | Koo et al. |
| 5,982,538 | A | 11/1999 | Shikama |
| 6,094,240 | A | 7/2000 | Hiyama |
| 6,912,074 | B1 | 6/2005 | Son et al. |
| 7,559,653 | B2 | 7/2009 | Silverstein |
| 7,857,455 | B2 | 12/2010 | Cowan et al. |
| 8,134,109 | B2 | 3/2012 | Tang et al. |
| 2008/0143965 | A1* | 6/2008 | Cowan ............... G02B 27/26 353/8 |
| 2010/0141856 | A1 | 6/2010 | Schuck |
| 2011/0096295 | A1 | 4/2011 | Cowan et al. |
| 2011/0205496 | A1 | 8/2011 | Schuck et al. |
| 2012/0057134 | A1 | 3/2012 | Huang |
| 2015/0109539 | A1 | 4/2015 | Li |

FOREIGN PATENT DOCUMENTS

| | | | |
|---|---|---|---|
| EP | 2469336 | A2 | 6/2012 |
| JP | H05-203894 | A | 8/1993 |
| JP | H05-241103 | A | 9/1993 |
| JP | 06-317760 | A | 11/1994 |
| JP | 07-146474 | A | 6/1995 |
| JP | 07146474 | A * | 6/1995 ............. G02F 1/335 |
| JP | H07-239473 | A | 9/1995 |
| JP | 07-333557 | A | 12/1995 |
| JP | H09-120047 | A | 5/1997 |
| JP | 2010-506199 | A | 2/2010 |
| JP | 2010-507130 | A | 3/2010 |
| JP | 2010-072138 | A | 4/2010 |
| JP | 2010-122589 | A | 6/2010 |
| JP | 2010-164802 | A | 7/2010 |
| KR | 10-2009-0089325 | A | 8/2009 |
| KR | 10-2009-0094224 | A | 9/2009 |
| SU | 1182471 | A | 9/1985 |
| WO | 2008/048494 | A2 | 4/2008 |

OTHER PUBLICATIONS

European Search Report in Appln. No. 14871124.5 dated Aug. 17, 2016.
European Search Report in Appln. No. 14742448.5 dated Apr. 14, 2015.
Canadian Office Action in Appln. No. 2,861,727 dated May 4, 2015.
Australian Office Action in Appln. No. 2014218464 dated Mar. 19, 2015.
Russian Decision on Grant in Appln. No. 2014135220 dated Nov. 24, 2015.
Chinese Office Action in Appln. No. 201480000777.6 dated Feb. 29, 2016.
International Search Report in International Application No. PCT/IB2014/002886, dated Jul. 7, 2015.
International Search Report in International Application No. PCT/KR2014/002563, dated Jun. 23, 2014.
The Basis and Application of Virtual Reality Technology, Xiaoqiang Hu, Beijing University of Posts and Telecommunications Press, the first edition in Feb. 2009, pp. 97-99: 3.1 Stereoscopic Display Technology.
Photography Measurement Experiment Course, Fei Deng et al, Wuhan University Press, the first edition in May 2012, pp. 47-48: 5.3.2 Stereoscopic Display System in Digital Era.
Theory and Methods of Design System for Digitalized Railway Line Selection, Sirong Yi, Southwest Jiao Tong University Press, the first edition in Nov. 2011, pp. 285-286: 2 Polaroid.
Chinese Office Action in Appln. No. 201480000777.6 dated Oct. 31, 2016 with English translation.
U.S. Office Action in U.S. Appl. No. 14/382,336 dated Jun. 2, 2016.
U.S. Final Office Action in U.S. Appl. No. 14/382,336 dated Jan. 19, 2017.

* cited by examiner

STEREOSCOPIC IMAGE DEVICE HAVING IMPROVED BRIGHTNESS AND METHOD FOR PROVIDING STEREOSCOPIC IMAGE

CROSS-REFERENCE TO RELATED APPLICATIONS

This application is the National Stage filing under 35 U.S.C. 371 of International Application No. PCT/IB2014/002886, filed on Dec. 29, 2014, which claims the benefit of Korean Patent Application No. 10-2013-0156411, filed on Dec. 16, 2013, and International Application No. PCT/KR2014/002563, filed on Mar. 26, 2014, the contents of which are all hereby incorporated by reference herein in their entirety.

TECHNICAL FIELD

The present invention relates to a stereoscopic image device having improved brightness and a method of providing a stereoscopic image, and more particularly, to a stereoscopic image device and a method of providing a stereoscopic image that are capable of projecting a stereoscopic image using two projectors in a triple-beam mode to provide a high-quality stereoscopic image.

BACKGROUND ART

FIG. 13 is a view showing the structure of a conventional polarizing beam splitter.

When light having a P-polarization and an S-polarization in a mixed state is incident upon a polarizing beam splitter (PBS) 1, the P-polarization is transmitted through the polarizing beam splitter 1 and the S-polarization is reflected by the polarizing beam splitter 1.

The reflected S-polarization and the transmitted P-polarization are directed in the same direction by diamond-shaped prisms 2 and 3.

For example, the P-polarization is transmitted through the prisms and is then changed into an S-polarization by a half wave plate (retarder) 4.

As a result, the light having the P-polarization and the S-polarization in the mixed state is changed into the same polarization, e.g. the S-polarization, by the polarizing beam splitter. That is, the light having the P-polarization and the S-polarization in the mixed state has the same direction.

The operation principle of a stereoscopic image device using the conventional polarizing beam splitter is as follows. U.S. Pat. No. 7,857,455 is referred to.

As shown in FIG. 14, light emitted from an imaging surface 5 for generating an image in a projector passes through a projection lens 6 and is then split into two beams by a polarizing beam splitter 7.

That is, light having an S-polarization component and a P-polarization component is reflected by the polarizing beam splitter 7, or is transmitted through the polarizing beam splitter 7.

The transmitted P-polarization component is changed into S-polarization while passing through a half wave retarder 8. The S-polarization is concentrated on a projection screen via reflective members 9 and 10, a polarizer 11, and a modulator 12.

The modulator 12 may change a polarization direction depending on, for example, an electric signal.

On the other hand, the S-polarization reflected by the polarizing beam splitter 7 reaches the projection screen via a reflective member 13 in a state in which the S-polarization is maintained in the same direction.

Consequently, the light, having mixed polarization directions, emitted from the imaging surface 5 is changed into a single S-polarization.

However, the stereoscopic image device using the conventional polarizing beam splitter has the following problems.

A left-eye image and a right-eye image are alternately emitted from the imaging surface 5. The images are displayed on the screen via the above-described elements. In a case in which a single projector is used to provide a stereoscopic image, parallax occurs when the left-eye image and the right-eye image are provided.

In addition, light projected by a single projector is split depending upon a polarization state of the light, and optical energy is consumed when the light is incident upon the screen. As a result, the luminance of the light is low.

DISCLOSURE

Technical Problem

An object of the present invention devised to solve the problem lies on a stereoscopic image device and a method of providing a stereoscopic image that are capable of continuously providing a right-eye image and a left-eye image irrespective of parallax in order to provide a high-quality stereoscopic image and that are capable of providing a stereoscopic image without the use of a modulator that is electrically driven.

Technical Solution

In accordance with an aspect of the present invention, the above and other objects can be accomplished by the provision of a stereoscopic image device including a first polarizing beam splitter for reflecting light incident along a first path in a first direction and a second direction and transmitting the light in a third direction based on polarization components of the light, a first reflective member for reflecting the light reflected by the first polarizing beam splitter to a screen, a second polarizing beam splitter for reflecting light incident along a second path in the first direction and the second direction and transmitting the light in the third direction based on polarization components of the light, and a second reflective member for reflecting the light reflected by the second polarizing beam splitter to the screen.

In accordance with another aspect of the present invention, there is provided a method of providing a stereoscopic image including a step of reflecting light incident along a first path and light incident along a second path in a first direction and a second direction and transmitting the light in a third direction based on polarization components of the light and a step of projecting the beams transmitted and reflected along the respective paths on a screen such that the beams overlap on the screen to form an image, wherein, at the step of reflecting and transmitting the light, the incident light is reflected in the first and second directions and transmitted in the third direction by a polarizing beam splitter, which is divided into at least two parts, the beams reflected in the first direction and the second direction are located so as to divide the section of the incident light into two equal parts, and each of the beams moving along the first path and the second path reaches the screen in a state in which each of the beams is divided into three beam parts, which overlap on the screen.

Advantageous Effects

According to the present invention, a left-eye image and a right-eye image are simultaneously provided using two projectors, and the left-eye image and a right-eye image are simultaneously projected on a screen. Consequently, it is possible to overcome parallax due to the alternating provision of images, which occurs in a conventional stereoscopic image device.

In addition, it is possible to provide images having higher luminance than in a conventional stereoscopic image device since the images are provided to the screen using the two projectors.

Furthermore, light projected by one projector is divided into three beams, which are combined on the screen, whereby it is possible to considerably reduce the height difference between the images and to realize a large screen.

BEST MODE

Hereinafter, the preferred embodiments of the present invention will be described with reference to the accompanying drawings.

Figure 1:
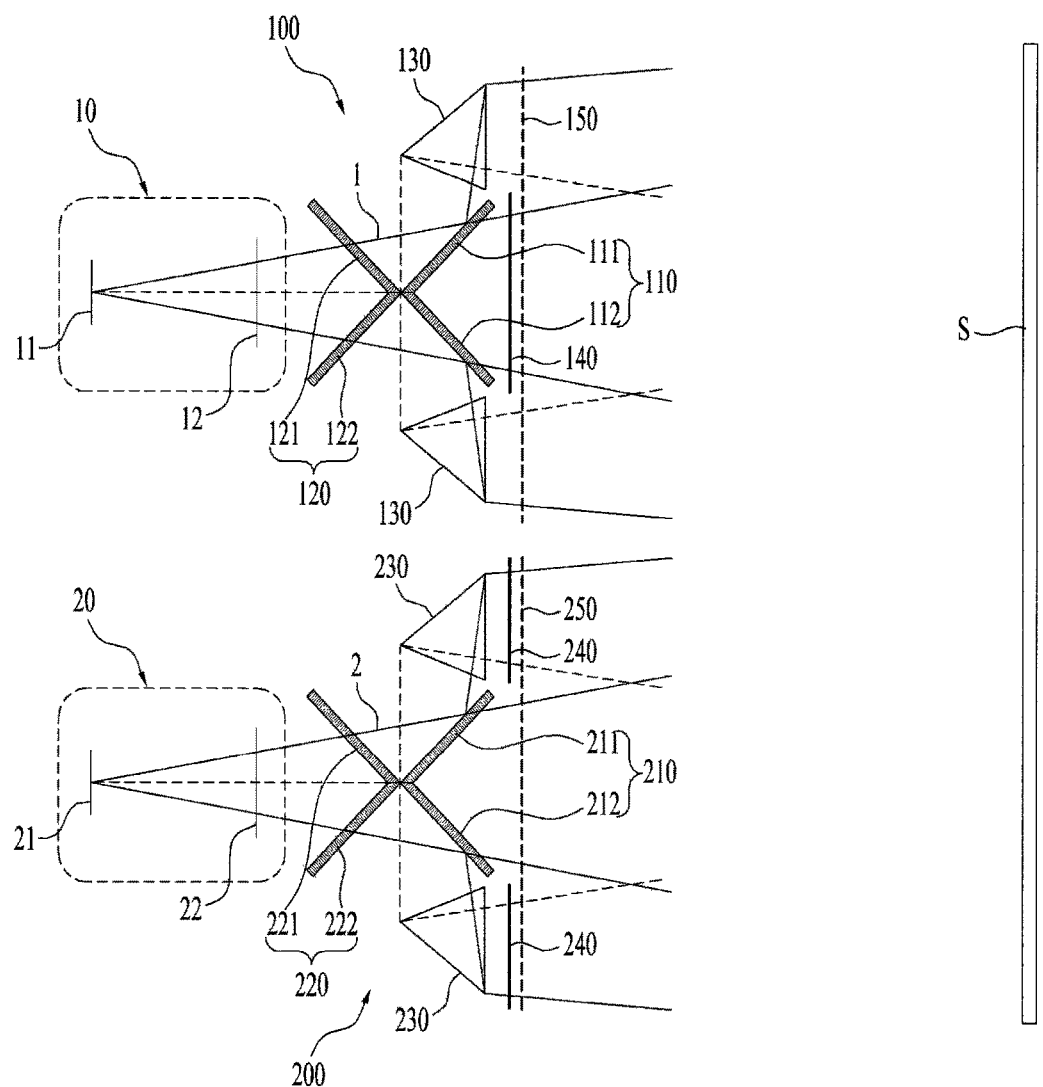
FIG. 1 is a view showing the structure of a stereoscopic image device according to a first embodiment of the present invention.

As shown in FIG. 1, a stereoscopic image device according to the present invention includes two projectors 10 and 20.

Hereinafter, an image signal will be referred to as 'light' for the sake of convenience and, therefore the term 'light' involves the meaning of 'image signal.'

Light is projected by the first projector 10 and the second projector 20. The first projector 10 includes a first image surface 11 and a first projection lens 12, and the second projector 20 includes a second image surface 21 and a second projection lens 22.

Hereinafter, a path of light that is projected by the first projector 10 and is then split will be referred to as a first path 1, and a path of light that is projected by the second projector 20 and is then split will be referred to as a second path 2.

The light that moves along the first path 1 is related to a left-eye image, and the light that moves along the second path 2 is related to a right-eye image. Alternatively, the light that moves along the first path 1 may be related to a right-eye image, and the light that moves along the second path 2 may be related to a left-eye image.

A stereoscopic image device 100 disposed on the first path 1 includes a first polarizing beam splitter 110, a refractive member 120, a pair of first reflective members 130, a first retarder 140, and a first clean-up polarizer 150.

A stereoscopic image device 200 disposed on the second path 2 includes a second polarizing beam splitter 210, a refractive member 220, a pair of second reflective members 230, second retarders 240, and a second clean-up polarizer 250.

The first and second polarizing beam splitters 110 and 210 may not be formed in a single flat plate shape. The first and second polarizing beam splitters 110 and 210 may be formed such that the first and second polarizing beam splitters 110 and 210 are bent in section.

The center of each of the first and second polarizing beam splitters 110 and 210 may be located on an optical axis of incident light.

The first polarizing beam splitter 110 includes one side part 111 and the other side part 112, and the second polarizing beam splitter 210 includes one side part 211 and the other side part 212. The one side part 111 and the other side part 112 may be inclined in different directions, and the one side part 211 and the other side part 212 may be inclined in different directions.

In the above structure, one half of the light incident upon the first and second polarizing beam splitters 110 and 210 may be incident upon the one side parts 111 and 211 of the first and second polarizing beam splitters 110 and 210, and the other half of the light incident upon the first and second polarizing beam splitters 110 and 210 may be incident upon the other side parts 112 and 212 of the first and second polarizing beam splitters 110 and 210.

The first and second polarizing beam splitters 110 and 210 transmit a P-polarization component of light moving along the first path 1 and the second path 2 and reflect an S-polarization component of the light moving along the first path 1 and the second path 2.

As a result, the light moving along the first and second paths 1 and 2 is split such that the light can move in three different directions.

Consequently, the P-polarization component of the light incident upon the first polarizing beam splitter 110 along the first path 1 is transmitted and then advances to a screen S.

On the other hand, the S-polarization component of the light incident upon the one side part 111 of the first polarizing beam splitter 110 is reflected and then advances in a first direction (in an upward direction in FIG. 1), and the S-polarization component of the light incident upon the other side part 112 of the first polarizing beam splitter 110 is reflected and then advances in a second direction (in a downward direction in FIG. 1).

That is, some of the incident light is reflected, and the rest of the incident light is transmitted.

Directions in which the light moving along the second path 2 is transmitted and reflected are identical to the directions in which the light moving along the first path 1 is transmitted and reflected.

The first reflective members 130 are disposed on opposite sides of the first polarizing beam splitter 110, and the second reflective members 230 are disposed on opposite sides of the second polarizing beam splitter 210.

Representative examples of the reflective members 130 and 230 may be mirrors. However, the present invention is not limited thereto. The reflective members 130 and 230 may be constituted by all elements, such as a prism, which are capable of performing a function of reflecting light.

The beams that are reflected by the first and second polarizing beam splitters 110 and 210 and then advance in two directions may be located so as to divide the section of the incident light into two equal parts.

The beams reflected and then advancing in the two directions have the same polarization component.

One of the reflective members 130 is disposed so as to face the one side part 111 of the first polarizing beam splitter 110, and the other of the reflective members 130 is disposed so as to face the other side part 112 of the first polarizing beam splitter 110.

The relationship between the first reflective members 130 and the first polarizing beam splitter 110 is equally applied to the relationship between the second reflective members 230 and the second polarizing beam splitter 210.

Consequently, the light reflected by the one side part 111 of the first polarizing beam splitter 110 and the light reflected by the other side part 112 of the first polarizing beam splitter 110 are incident upon the first reflective members 130, are reflected by the first reflective members 130, and then advance to the screen.

In the same manner, the light reflected by the one side part 211 of the second polarizing beam splitter 210 and the light reflected by the other side part 212 of the second polarizing beam splitter 210 are incident upon the second reflective members 230, are reflected by the second reflective members 230, and then advance to the screen.

The beam reflected by the first polarizing beam splitter 110 and the first reflective members 130 while moving along the first path 1 and the beam reflected by the second polarizing beam splitter 210 and the second reflective members 230 while moving along the second path 2 are combined with each other on the screen.

The beams are combined on the screen with beams having being transmitted through the first and second polarizing beam splitters 110 and 210.

Meanwhile, the first light refractive member 120 is disposed in front of the first polarizing beam splitter 110, and the second light refractive member 220 is disposed in front of the second polarizing beam splitter 210.

The first and second light refractive members 120 and 220 are provided so as to prevent the attenuation of light incident upon the centers of the first and second polarizing beam splitters 110 and 210.

The light refractive members will be described hereinafter in detail.

The first retarder 140 is disposed in the direction in which the light is emitted from the first polarizing beam splitter 110 (at the rear of the first polarizing beam splitter 110). The first retarder 140 is a half wave retarder, which rotates the P-polarization transmitted through the first polarizing beam splitter 110 by 90 degrees such that the P-polarization is changed into an S-polarization.

A half wave retarder may be used as the first retarder 140.

Meanwhile, the first clean-up polarizer 150 is also provided in addition to the first retarder 140. The first clean-up polarizer 150 functions to improve polarization characteristics.

The first clean-up polarizer 150 functions to improve polarization states of the light reflected by the first polarizing beam splitter 110 and the reflective members 130 and the light transmitted through the first polarizing beam splitter 110 and the first retarder 140.

The first clean-up polarizer 150 receives both the reflected light and the transmitted light. To this end, the first clean-up polarizer 150 is formed of a single wide member. Alternatively, the first clean-up polarizer 150 may be divided into three members, which may be selectively arranged or removed depending upon the polarization efficiency of the first clean-up polarizer 150.

Meanwhile, no retarder is disposed in the direction in which the light is emitted from the second polarizing beam splitter 210. Rather, the second retarders 240 are disposed in the direction in which the light is emitted from the second reflective members 230.

Two second retarders 240 are provided since two second reflective members 230 are provided.

The second retarders 240 function to change the polarization states of the beams reflected by the second reflective members 230 while moving along the second path 2.

For example, in a case in which the beams reflected by the second reflective members 230 are S-polarizations, the second retarders 240 retard the wavelength of the S-polarizations by a half wavelength such that the S-polarizations are changed into P-polarizations.

The second clean-up polarizer 250 is disposed in the direction in which the light is emitted from the second polarizing beam splitter 210 and in the vicinity of the second reflective members 230 (or the second retarders 240). The second clean-up polarizer 250 is configured to have a shape that is capable of receiving both the beams (the reflected light and the transmitted light) moving along the second path.

To this end, the second clean-up polarizer 250 is formed of a single wide member. Alternatively, the second clean-up polarizer 250 may be divided into three members, which may be selectively arranged or removed depending upon the polarization efficiency of the second clean-up polarizer 250.

Meanwhile, the first and second clean-up polarizers 150 and 250 are provided in a case in which the final state of the image incident upon the screen S is a linear polarization, which includes an S-polarization on one side and a P-polarization on the other side.

However, the first and second clean-up polarizers 150 and 250 may be selectively provided depending upon the state of a linear polarization that is finally directed to the screen. That is, the first and second clean-up polarizers 150 and 250 are provided so as to increase the level of linear polarization. In a case in which the original degree of a polarization is high, therefore, the first and second clean-up polarizers 150 and 250 are not necessarily needed.

Figure 2:
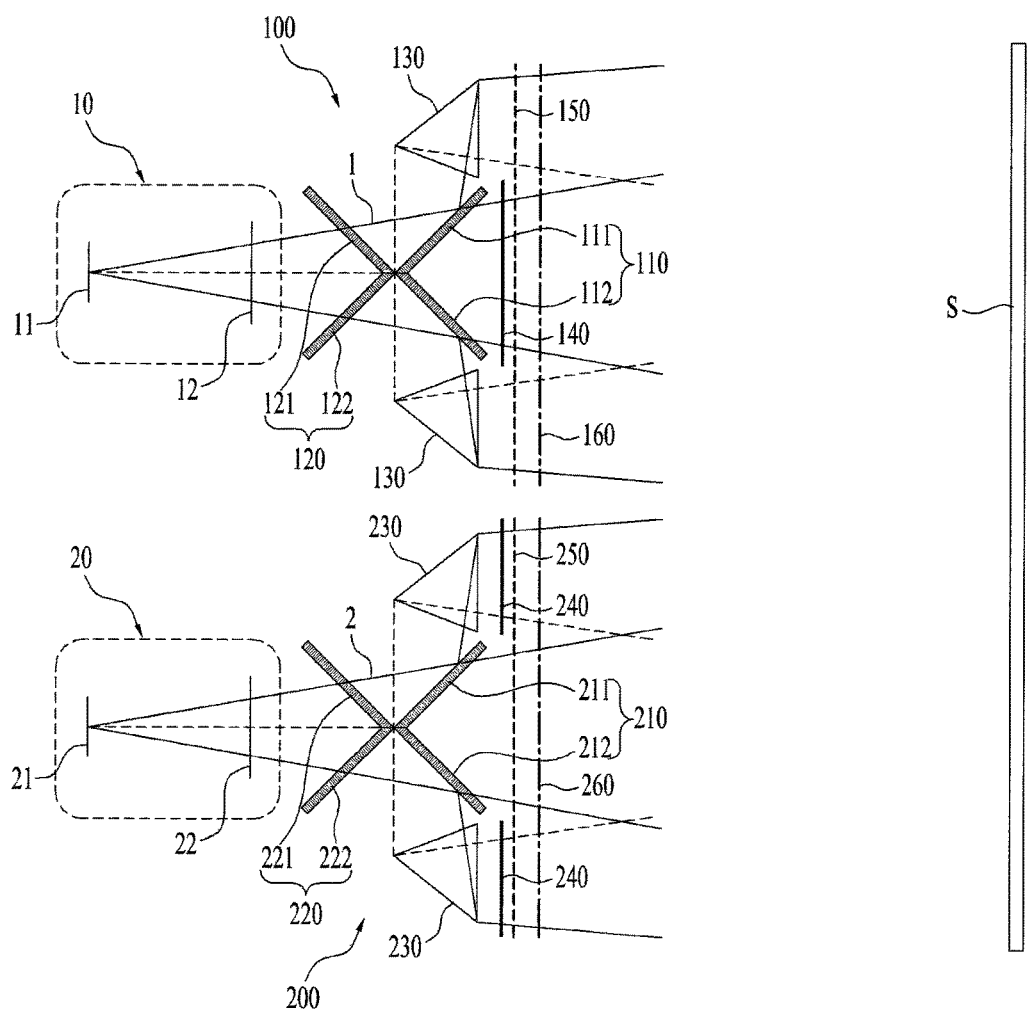
FIG. 2 is a view showing the structure of a stereoscopic image device according to a second embodiment of the present invention.

In a case in which an image to be incident upon the screen S is a circular polarization, particularly in a case in which an image projected by the first projector 10 is a left-eye image and an image projected by the second projector 20 is a right-eye image, first and second quarter wave retarders 160 and 260 are disposed at the rear of the first and second clean-up polarizers 150 and 250, respectively, as shown in FIG. 2.

The first quarter wave retarder 160 may be disposed at the rear of the first clean-up polarizer 150, and the second quarter wave retarder 160 may be disposed at the rear of the second clean-up polarizer 250.

The first and second clean-up polarizers 150 and 260 may be omitted.

The first and second quarter wave retarders 160 and 260 may convert an incident linear polarization into a circular polarization which is rotated in a clockwise direction or in a counterclockwise direction. The first and second quarter wave retarders 160 and 260 may rotate the linear polarization in the clockwise direction or in the counterclockwise direction while retarding the wavelength of the linear polarization by a quarter wavelength to generate a circular polarization. Specifically, in a case in which a quarter wave retarder is disposed in a direction in which light is incident in order to retard the wavelength of the light by a quarter wavelength, the light may become a circular polarization that is rotated in the clockwise direction. On the other hand, in a case in which a quarter wave retarder is disposed in a direction opposite the direction in which light is incident in order to retard the wavelength of the light by a—quarter wavelength, the light may become a circular polarization that is rotated in the counterclockwise direction.

In another embodiment of the present invention, light transmitted through the first projector 10 and light transmitted through the second projector 20 may have the same polarization axis, and light reflected by the first projector 10 and light reflected by the second projector 20 may also have the same polarization axis. In addition, a circular polarization that is rotated in a clockwise direction may be generated from transmitted light and reflected light projected by the first projector 10 using a quarter wave retarder, and a circular polarization that is rotated in a counterclockwise direction may be generated from transmitted light and reflected light projected by the second projector 20 using a negative quarter wave retarder.

In this case, the transmitted light and the reflected light projected by the first projector 10 and/or the second projector 20 may have the same polarization axis as the result of using a half wave retarder, as shown in FIG. 2. However, even in a case in which the transmitted light and the reflected light projected by the first projector 10 and/or the second projector 20 have perpendicular polarization axes as the result of not using the half wave retarder, only the direction of a circular polarization may be controlled using the quarter wave retarder (or the negative quarter wave retarder) in order to realize a left image and/or a right image.

Meanwhile, the construction in a case in which an image incident upon the screen is a circular polarization is identical to the construction in the case in which the image incident upon the screen is the linear polarization except that the quarter wave retarder is additionally provided at the rear of the clean-up polarizer (in a case in which the degree of a polarization is high, only the quarter wave retarder is provided without the clean-up polarizer), as described above, and therefore a detailed description thereof will be omitted.

Figure 3:
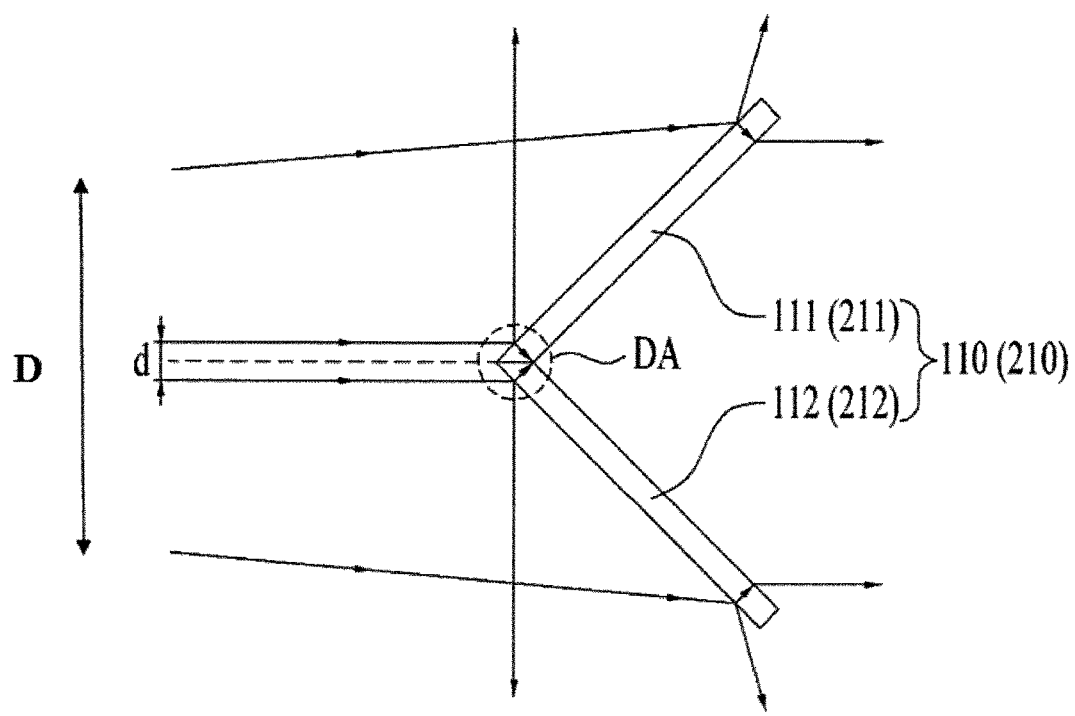
FIG. 3 is a view showing a path of light in a case in which no light refractive member is included in the stereoscopic image device according to the present invention.
Figure 4:
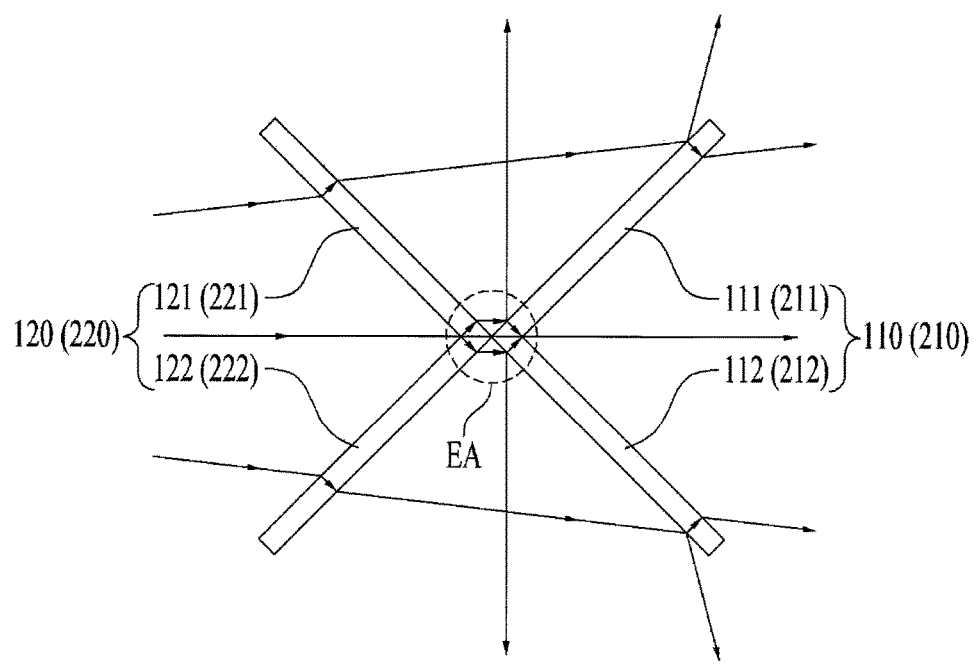
FIG. 4 is a view showing a path of light in a case in which a light refractive member is included in the stereoscopic image device according to the present invention.

FIG. 3 is a view showing a path of light incident upon the first polarizing beam splitter or the second polarizing beam splitter in a case in which no light refractive member is provided, and FIG. 4 is a view showing a path of light incident upon the first polarizing beam splitter or the second polarizing beam splitter in a case in which the light refractive member is provided.

As shown in FIG. 3, light, having a diameter D, incident upon the first polarizing beam splitter 110 or the second polarizing beam splitter 210 is refracted when the light is transmitted through the inclined one side part 111 or 211 and the inclined other side part 112 and 212 of the first polarizing beam splitter 110 or the second polarizing beam splitter 210.

In this case, most of the transmitted light is transmitted through the first polarizing beam splitter 110 or the second polarizing beam splitter 210 and moves behind the first polarizing beam splitter 110 or the second polarizing beam splitter 210.

However, a central portion of the light (light having a diameter d) enters the connection between the one side part 111 or 211 and the other side part 112 and 212 of the first polarizing beam splitter 110 or the second polarizing beam splitter 210 and then converges upon one point.

Consequently, the light having the diameter d does not reach the screen but is attenuated.

That is, light is incident upon the bent portion or the center portion of the first polarizing beam splitter 110 or the second polarizing beam splitter 210 and is then concentrated on one point to form a dimming area (DA).

Some of the light having passed through the first polarizing beam splitter 110 or the second polarizing beam splitter 210 passes through the dimming area (DA). At this time, the energy of the light is reduced. Consequently, luminous intensity on the screen is lowered, with the result that the entire area of the screen is darkened somewhat.

Therefore, it is necessary to provide a correction method that is capable of solving the above problem.

FIG. 4 shows the structure of the first light refractive member 120 or the second light refractive member 220 related to such a correction method.

As shown in FIG. 4, the first light refractive member 120 or the second light refractive member 220 may have a refractive index and thickness similar to those of the first polarizing beam splitter 110 or the second polarizing beam splitter 210.

The first and second light refractive members 120 and 220 may each be formed to have a plate shape. However, the present invention is not limited thereto.

The portion of the light refractive member 120 or 220 disposed in front of the one side part 111 or 211 of the first polarizing beam splitter 110 or the second polarizing beam splitter 210 is referred to as one side corresponding part 121 or 221, and the portion of the light refractive member 120 or 220 disposed in front of the one other side part 112 or 212 of the first polarizing beam splitter 110 or the second polarizing beam splitter 210 is referred to as the other side corresponding part 122 or 222.

The shape of the light refractive members 120 and 220 is similar to that of the polarizing beam splitters 110 and 210.

That is, the one side corresponding part 121 or 221 is located at one side of the optical axis and the other side corresponding part 122 or 222 is located at the other side of the optical axis. The one side corresponding part 121 or 221 and the other side corresponding part 122 or 222 are connected to each other. A bent portion is formed at the center of the light refractive member 120 or 220.

The light refractive member 120 or 220 may face the polarizing beam splitter 110 or 210, respectively, in a symmetrical fashion.

The one side corresponding part 121 or 221 and the other side corresponding part 122 or 222, each of which is formed in a plate shape, are connected to each other so as to be inclined in different directions.

In the above structure, a path of light is formed as follows.

Light incident upon the light refractive member 120 or 220 is refracted, with the result that the path of the light is changed. The light moves to the polarizing beam splitter 110 or 210.

At this time, an empty area (EA), though which light does not pass, is formed between the center portion of the light refractive member 120 or 220 and the light refractive member 120 or 220 since the center portion of the light refractive member 120 or 220 is bent.

The path of the light incident upon the dimming area (DA) shown in FIG. 3 corresponds to the empty area (EA) shown in FIG. 4. Since the light does not advance to the empty area (EA) any further due to refraction of the light by the light refractive member 120 or 220, the light is no longer incident upon the dimming area (D). Consequently, it is possible to prevent the loss of light due to light attenuation.

Hereinafter, a description will be given of the operation of the present invention in a case in which an image projected by the first projector and an image projected by the second projector are different from each other.

Figure 5:
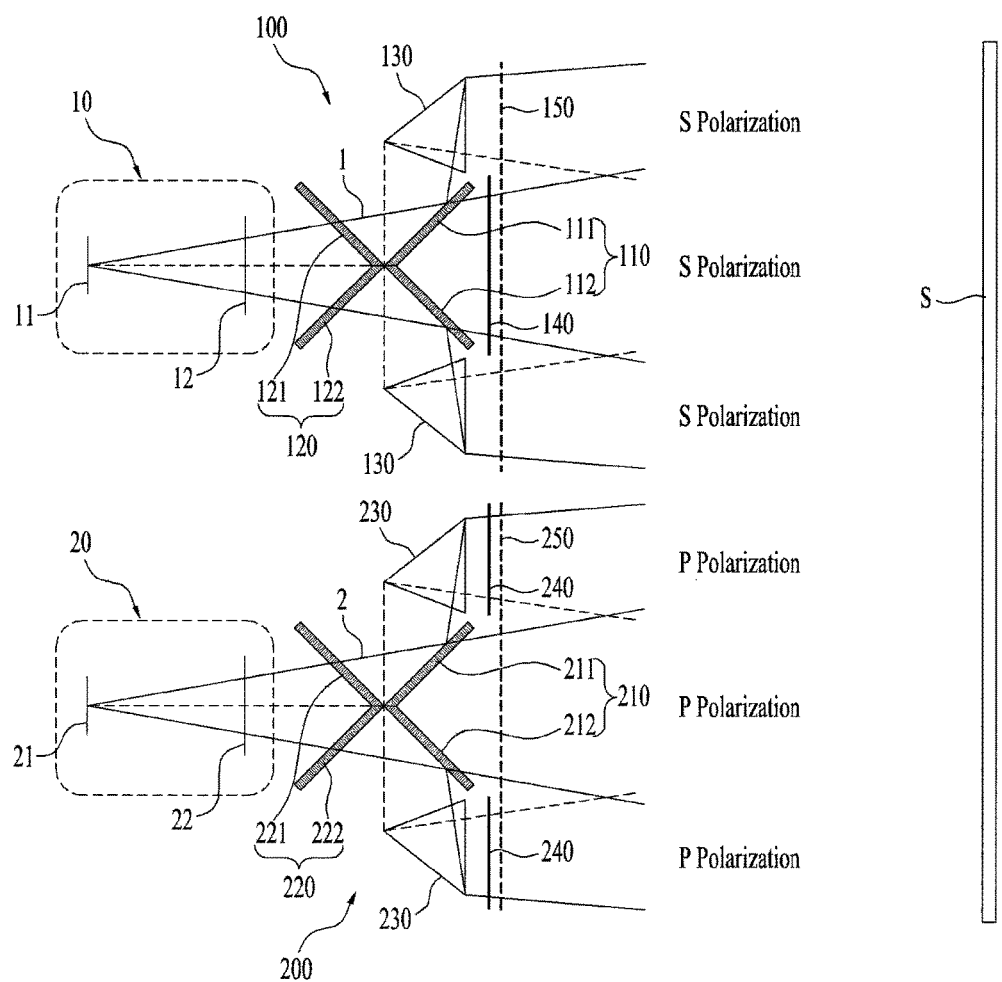
FIG. 5 is a view showing an operation in which different linear polarizations are incident upon a screen in accordance with a first embodiment of the present invention.

FIG. 5 is a view showing that polarizations (an S-polarization and a P-polarization) having different polarization characteristics are incident upon the screen in the form of a linear polarization.

In a case in which a left-eye image is projected by the first projector 10 along the first path 1 and a right-eye image is projected by the second projector 20 along the second path 2, as shown in FIG. 5, a P-polarization component of the light on the first path 1 passes through the first polarizing beam splitter 110 and is then incident upon the first retarder 140, by which the P-polarization is converted into an S-polarization. The S-polarization is incident upon the first clean-up polarizer 150, by which the degree of the S-polarization is improved, and then reaches the screen.

Meanwhile, an S-polarization component of the light on the first path 1 is reflected by the first polarizing beam splitter 110 and is then reflected by the first reflective member 130. Subsequently, the S-polarization is incident upon the first clean-up polarizer 150, by which the degree of the S-polarization is improved, and then reaches the screen S.

A P-polarization component of the light on the second path 2 passes through the second polarizing beam splitter 210 and is then incident upon the second clean-up polarizer 150, by which the degree of the S-polarization is improved, and then reaches the screen S.

In addition, an S-polarization component of the light on the second path 2 is reflected by the second polarizing beam splitter 210 and is then reflected by the second reflective member 230. Subsequently, the S-polarization is incident upon the second retarder 240, by which the S-polarization is converted into a P-polarization.

The P-polarization is incident upon the second clean-up polarizer 250, by which the degree of the P-polarization is increased, and then reaches the screen S.

As a result, the S-polarization left-eye image and the P-polarization right-eye image overlap on the screen S. Consequently, it is possible to provide a stereoscopic image that is brighter than one from a conventional system, which alternately provides a left-eye image and a right-eye image using a single projector while having parallax.

Figure 6:
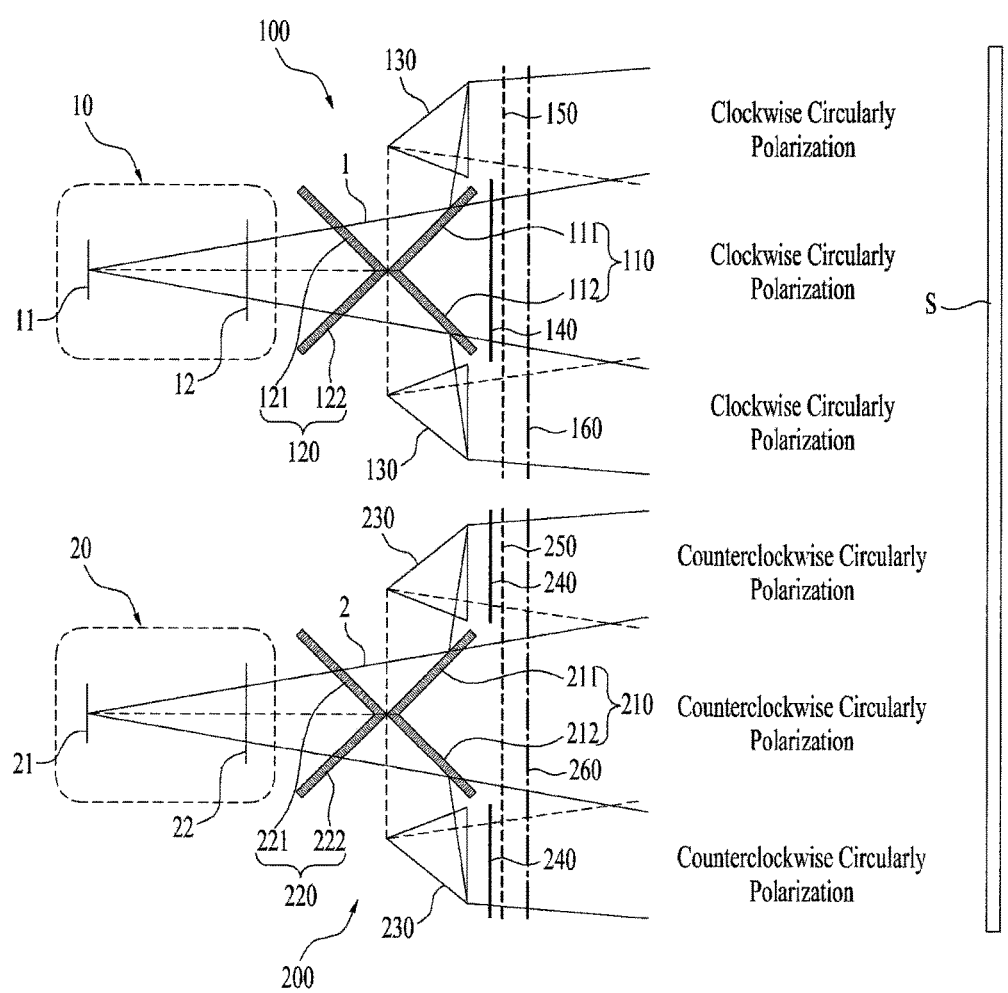
FIG. 6 is a view showing an operation in which different circular polarizations are incident upon a screen in accordance with a second embodiment of the present invention.

FIG. 6 is a view showing that different circular polarizations (a clockwise circular polarization and a counterclockwise circular polarization) are incident upon the screen.

In a case in which a left-eye image is projected by the first projector 10 along the first path 1 and a right-eye image is projected by the second projector 20 along the second path 2, as shown in FIG. 5, a P-polarization component of the light on the first path 1 passes through the first polarizing beam splitter 110 and is then incident upon the first retarder 140, by which the P-polarization is converted into an S-polarization. The S-polarization is incident upon the first quarter wave retarder 160, by which the S-polarization is converted into a clockwise circular polarization, and the clockwise circular polarization reaches the screen S.

Meanwhile, an S-polarization component of the light on the first path 1 is reflected by the first polarizing beam splitter 110 and is then reflected by the first reflective member 130. Subsequently, the S-polarization is incident upon the first quarter wave retarder 160, by which the S-polarization is converted into a clockwise circular polarization, and the clockwise circular polarization reaches the screen S.

In a case in which the first clean-up polarizer 150 is disposed between the first retarder 140 and the first quarter wave retarder 160 or between the first reflective member 130 and the first quarter wave retarder 160, the polarization is incident upon the first clean-up polarizer 150, by which the degree of the polarization is improved, before the light is incident upon the first quarter wave retarder 160.

A P-polarization component of the light on the second path 2 passes through the second polarizing beam splitter 210 and is then incident upon the second quarter wave retarder 260, by which the P-polarization is converted into a counterclockwise circular polarization, and the counterclockwise circular polarization reaches the screen S.

In addition, an S-polarization component of the light on the second path 2 is reflected by the second polarizing beam splitter 210 and is then reflected by the second reflective member 230. Subsequently, the S-polarization is incident upon the second retarder 240, by which the S-polarization is converted into a P-polarization.

The P-polarization is incident upon the second quarter wave retarder 250, by which the P-polarization is converted into a counterclockwise circular polarization, and the counterclockwise circular polarization reaches the screen S.

In a case in which the second clean-up polarizer 250 is disposed between the second retarder 240 and the second quarter wave retarder 260 or between the second polarizing beam splitter 210 and the second quarter wave retarder 260, the polarization is incident upon the second clean-up polarizer 250, by which the degree of the polarization is increased, before the light is incident upon the second quarter wave retarder 260.

Next, a description will be given of a method of overcoming the difference between the image-forming surface of the light reflected by the first polarizing beam splitter 110 or the second polarizing beam splitter 210 shown in FIG. 1 and the image-forming surface of the light transmitted through the first polarizing beam splitter 110 or the second polarizing beam splitter 210 in order to provide images having the same size on the screen.

Only one of the two projectors shown in FIG. 1 will be described with reference to FIG. 7. However, the same principle may be applied to the other projector.

Figure 7:
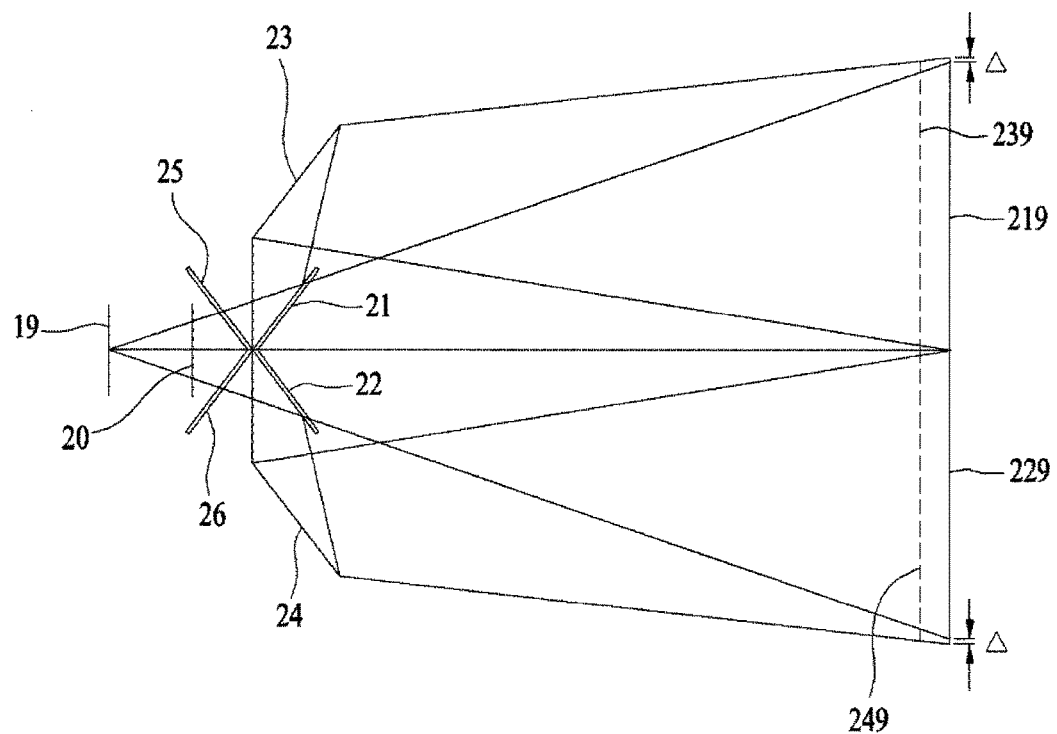
FIG. 7 is a view showing a path of light from one projector of the stereoscopic image device according to the present invention.

The first polarizing beam splitter 110 of FIG. 1 is shown as including a first beam splitter 21 and a second beam splitter 22 in FIG. 7. In addition, the first reflective member 130 of FIG. 1 is shown as including a first reflective member 23 and a second reflective member 24 in FIG. 7.

FIG. 7 shows a height difference Δ between image-forming surfaces of light primarily reflected by the first beam splitter 21 and the second beam splitter 22 and secondarily reflected by the first reflective member 23 and the second reflective member 24 and image-forming surfaces of light transmitted through the first beam splitter 21 and the second beam splitter 22.

Reference numeral 219 indicates the image-forming surface of the light transmitted through the first beam splitter 21, and reference numeral 229 indicates the image-forming surface of the light transmitted through the second beam splitter 22.

Reference numeral 239 indicates the image-forming surface of the light reflected by the first reflective member 23, and reference numeral 249 indicates the image-forming surface of the light reflected by the second reflective member 249.

The image-forming surfaces 239 and 249 of the light moving along reflection paths are located in front of the image-forming surfaces 219 and 229 of the light moving along transmission paths. The height difference $\Delta$ is generated due to such a difference in position.

The height difference $\Delta$ may be reduced using the following four methods.

Figure 8:
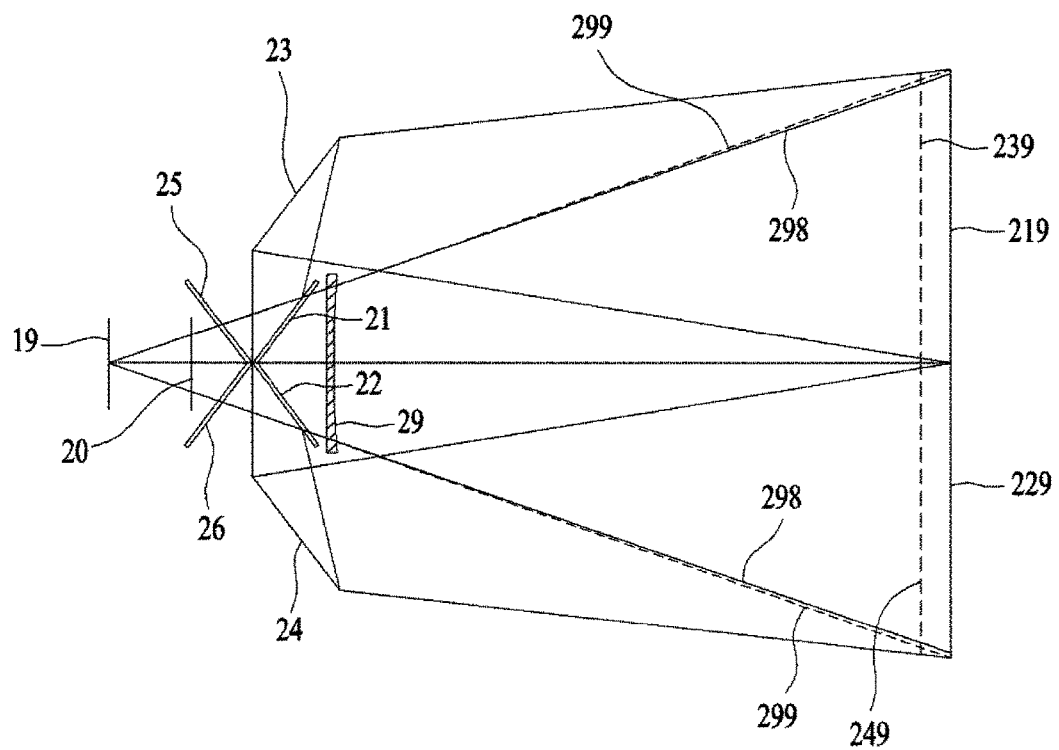
FIG. 8 is a side view showing a structure for correcting a path of light transmitted through one projector of the stereoscopic image device according to the present invention.

A first method is to increase a divergence angle of the light transmitted through the first beam splitter 21 and the second beam splitter 22 using a lens 29, as shown in FIG. 8.

The lens 29 may have the characteristics of a concave lens in order to increase the divergence angle of the light.

In this method, a light path 299 after correction is performed by the lens 29 diverges more than a light path 298 before correction is performed by the lens 29, with the result that the size of an image on the screen is increased.

Referring to FIG. 8, a transmission path indicated by a solid line indicates the path 298 before correction is performed by the lens 29, and a transmission path indicated by a dotted line indicates the path 299 after correction is performed by the lens 29.

It can be seen that the path indicated by the dotted line diverges more than the path indicated by the solid line.

As a result, the size of an image formed on the screen by the light moving along the transmission paths becomes equal to the size of an image formed on the screen by the light moving along the reflection paths, whereby the above-described height difference $\Delta$ may be eliminated.

At this time, it should be noted that the lens 29 must be disposed between the two reflection paths such that the beams moving along the reflection paths do not interfere with the lens 29.

Figure 9:
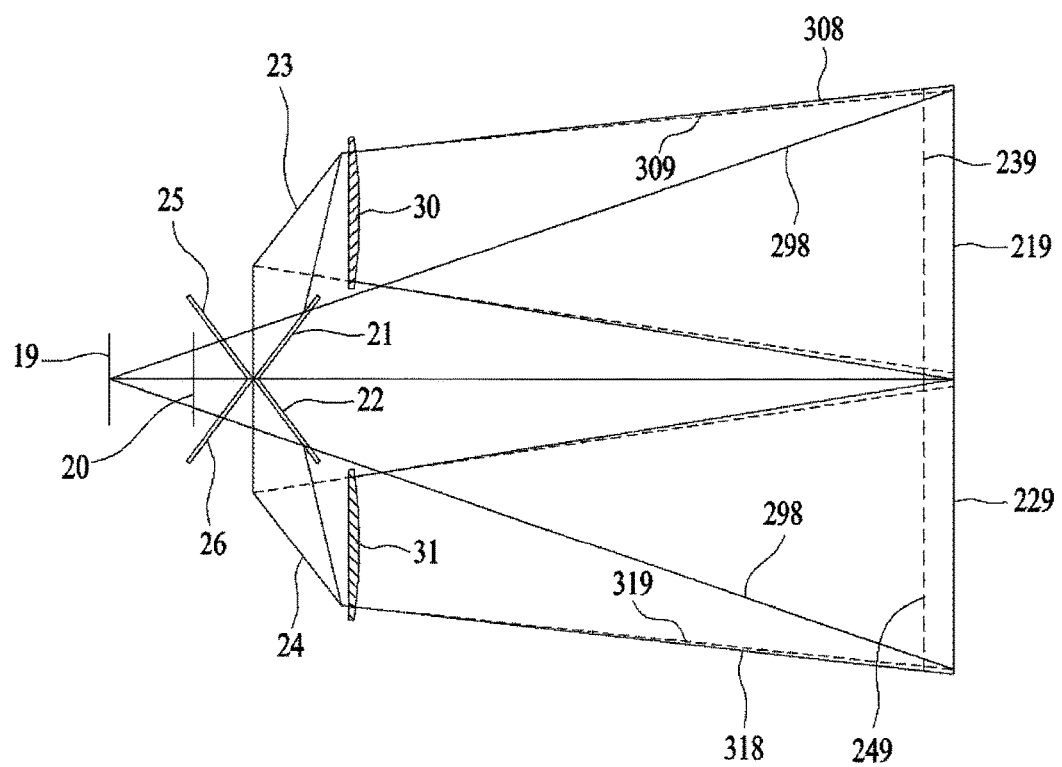
FIGS. 9 to 12 are side views showing structures for correcting a path of light reflected by one projector of the stereoscopic image device according to the present invention.

A second method of removing the height difference $\Delta$ is to dispose lenses 30 and 31 in order to reduce the divergence angles of the beams on the reflection paths, as shown in FIG. 9.

The lenses 30 and 31 may have the characteristics of convex lenses in order to decrease the divergence angles of the beams to a certain extent.

The lenses 30 and 31 may be disposed adjacent to the first reflective member 23 and the second reflective member 24 in a state in which the lenses 30 and 31 are located on paths along which the beams reflected by the first reflective member 23 and the second reflective member 24 advance.

In this method, light paths 309 and 319 after correction is performed by the lenses 30 and 31 diverge less than light paths 308 and 318 before correction is performed by the lenses 30 and 31, with the result that the size of an image on the screen is decreased.

Referring to FIG. 9, reflection paths indicated by solid lines indicate the paths 308 and 318 before correction is performed by the lenses 30 and 31, and reflection paths indicated by dotted lines indicate the paths 309 and 319 after correction is performed by the lenses 30 and 31.

It can be seen that the paths indicated by the dotted lines diverge less than the paths indicated by the solid lines.

As a result, the size of an image formed on the screen by the beams moving along the reflection paths becomes equal to the size of an image formed on the screen by the beams moving along the transmission paths, whereby the above-described height difference $\Delta$ may be eliminated.

At this time, it should be noted that the lenses 30 and 31 must deviate from the transmission paths such that the beams moving along the transmission paths do not interfere with the lenses 30 and 31.

Figure 10:
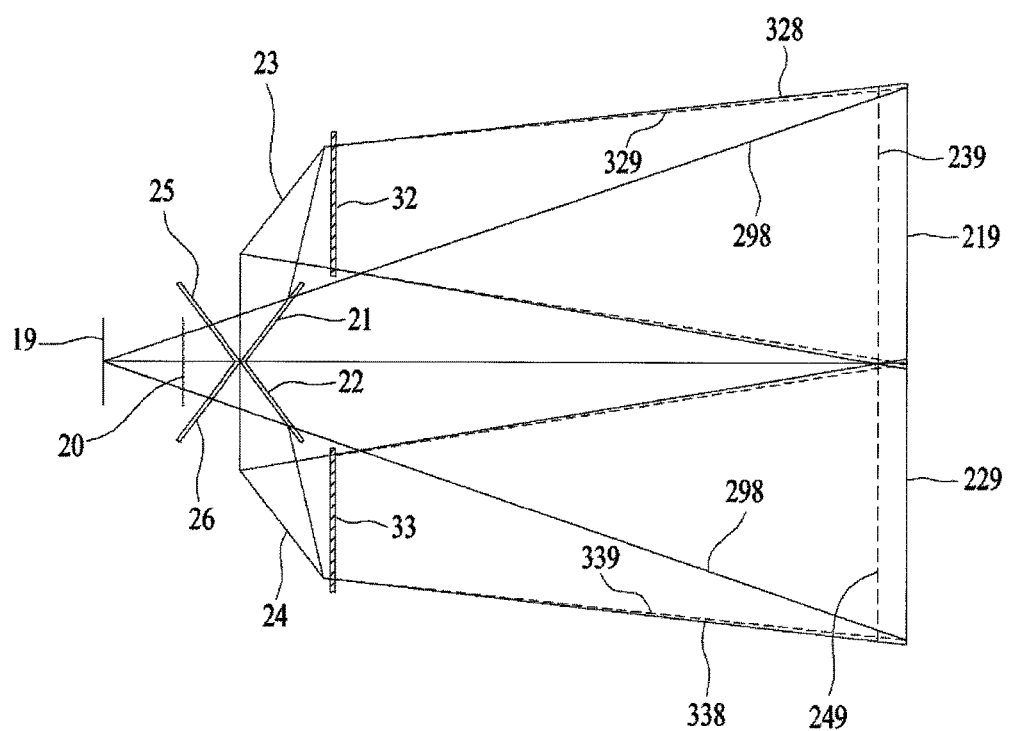

Meanwhile, it is possible to use a method of correcting paths of beams using plates or prisms 32 and 33 to reduce divergence angles of the beams, as shown in FIG. 10, instead of using the correction method using the lenses 30 and 31, as shown in FIG. 9.

This is a third method of removing the height difference $\Delta$.

The plates or prisms 32 and 33 may have the characteristics of convex lenses in order to decrease the divergence angles of the beams to a certain extent.

The plates or prisms 32 and 33 may be disposed adjacent to the first reflective member 23 and the second reflective member 24 in a state in which the plates or prisms 32 and 33 are located on paths along which the beams reflected by the first reflective member 23 and the second reflective member 24 advance.

In this method, light paths 329 and 339 after correction is performed by the plates or prisms 32 and 33 diverge less than light paths 328 and 338 before correction is performed by the plates or prisms 32 and 33, with the result that the size of an image on the screen is decreased.

Referring to FIG. 10, reflection paths indicated by solid lines indicate the paths 328 and 338 before correction is performed by the plates or prisms 32 and 33, and reflection paths indicated by dotted lines indicate the paths 329 and 339 after correction is performed by the plates or prisms 32 and 33.

It can be seen that the paths indicated by the dotted lines diverge less than the paths indicated by the solid lines.

As a result, the size of an image formed on the screen by the beams moving along the reflection paths becomes equal to the size of an image formed on the screen by the beams moving along the transmission paths, whereby the above-described height difference $\Delta$ may be eliminated.

At this time, it should be noted that the plates or prisms 32 and 33 must deviate from the transmission paths such that the beams moving along the transmission paths do not interfere with the plates or prisms 32 and 33.

Figure 11:
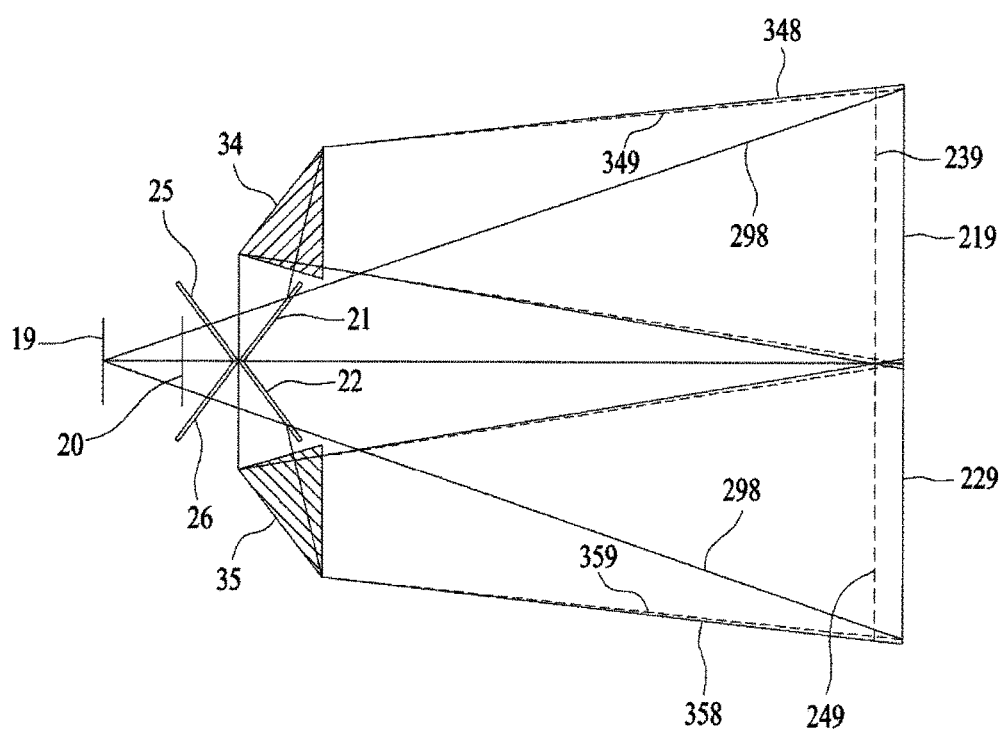

A fourth method of removing the height difference $\Delta$ is to use reflective member-prism assemblies (mirror-prism assemblies) 34 and 35, as shown in FIG. 11.

The reflective member-prism assemblies 34 and 35 are configured such that the lenses 30 and 31 or the plates or prisms 31 and 32 shown in FIG. 9 or 15 are more easily spaced apart from the reflective members.

The reflective member-prism assemblies 34 and 35 reduce divergence angles of beams.

The reflective member-prism assemblies 34 and 35 may be located on paths along which the beams reflected by the first beam splitter 21 and the second beam splitter 22 advance.

In this method, light paths 349 and 359 after correction is performed by the reflective member-prism assemblies 34 and 35 diverge less than light paths 348 and 358 before correction is performed by the reflective member-prism assemblies 34 and 35, with the result that the size of an image on the screen is decreased.

Referring to FIG. 11, reflection paths indicated by solid lines indicate the paths 348 and 358 before correction is performed by the reflective member-prism assemblies 34 and 35, and reflection paths indicated by dotted lines indicate the paths 349 and 359 after correction is performed by the reflective member-prism assemblies 34 and 35.

It can be seen that the paths indicated by the dotted lines diverge less than the paths indicated by the solid lines.

As a result, the size of an image formed on the screen by the beams moving along the reflection paths becomes equal to the size of an image formed on the screen by the beams moving along the transmission paths, whereby the above-described height difference Δ may be eliminated.

Figure 12:
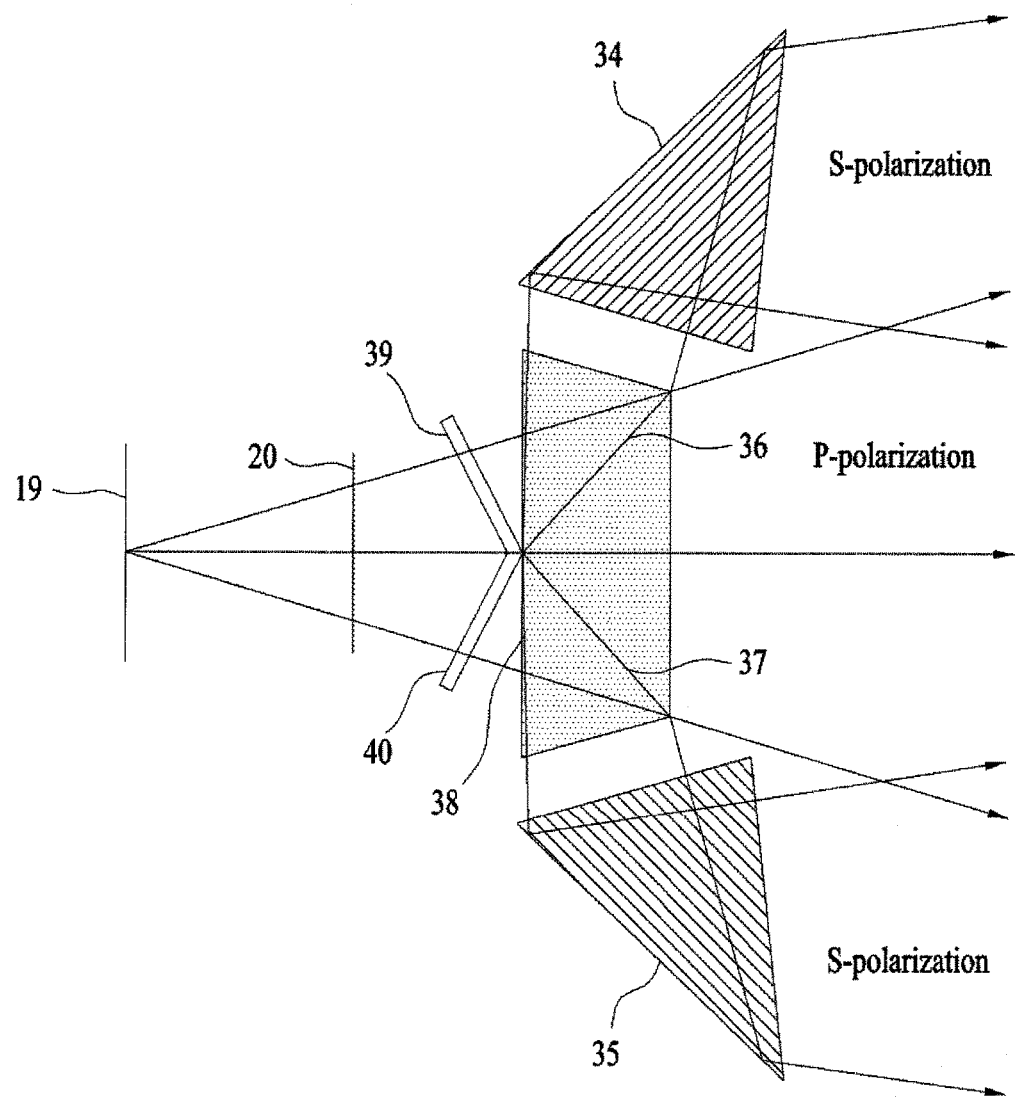
Figure 13:
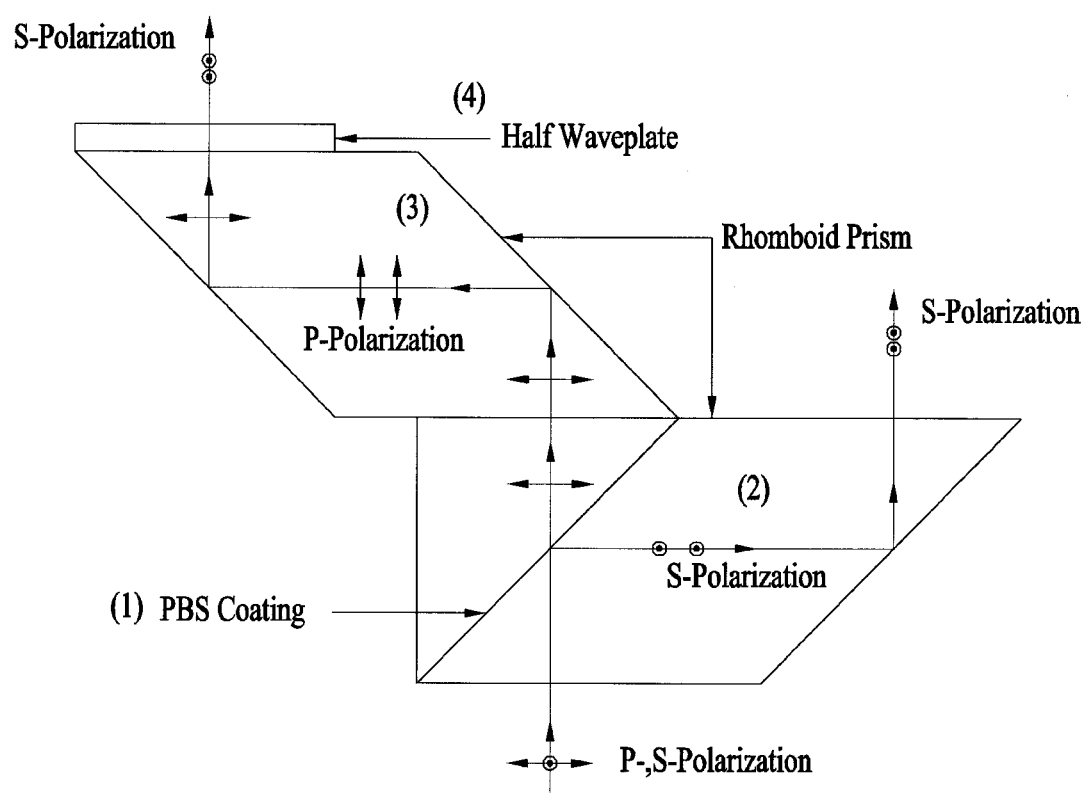
FIG. 13 is a view showing a conventional polarizing beam splitting method for obtaining a single polarization.
Figure 14:
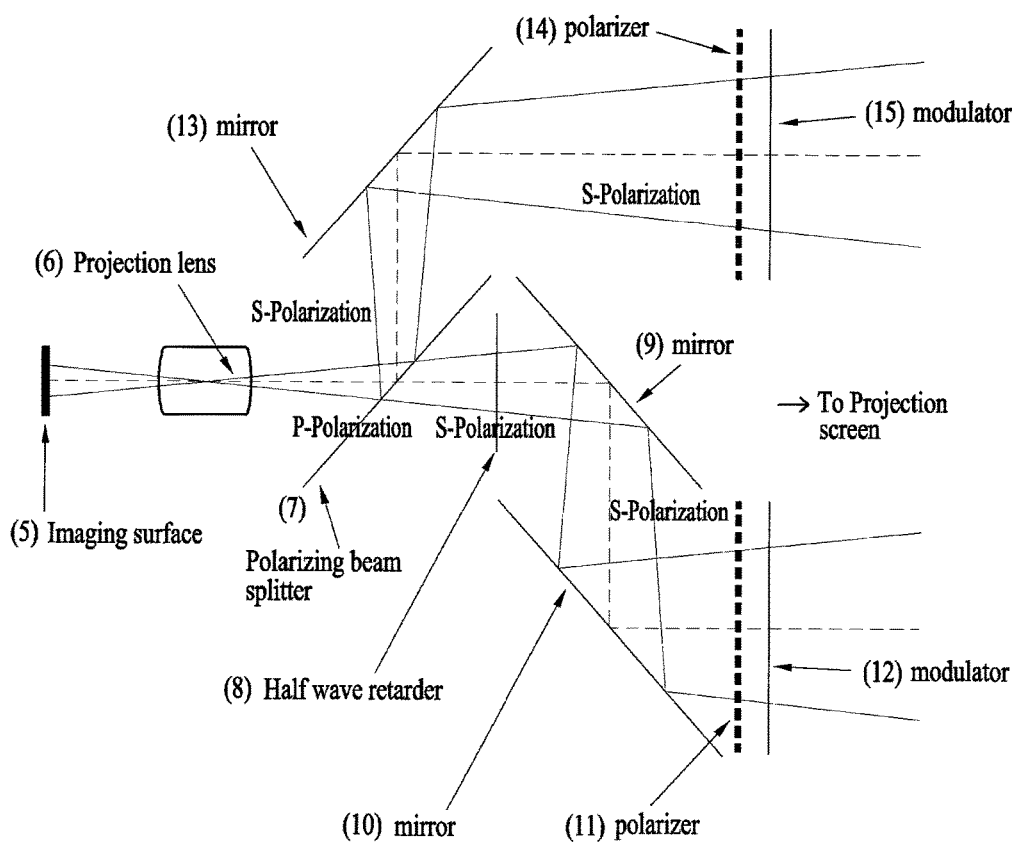
FIG. 14 is a view showing a conventional stereoscopic image device.

Meanwhile, it is possible to provide the same effect even when using a polarizing beam splitter constituted by a prism 38 having two beam splitting surfaces 36 and 37, as shown in FIG. 12.

That is, the polarizing beam splitter may include the beam splitting surfaces 36 and 37, which are connected to each other while being inclined, and the prism 38.

A polarization having a specific direction (e.g. a P-polarization) is transmitted through the beam splitting surfaces 36 and 37.

In addition, a polarization having another direction (e.g. an S-polarization) is reflected by the beam splitting surfaces 36 and 37, and the path of the reflected light is corrected by the prism 38. That is, the path of the reflected light is corrected such that the path of the reflected light diverges less.

Meanwhile, refractive members 39 and 40 may be disposed in front of the polarizing beam splitter. The function and structure of the refractive members 39 and 40 are the same as those of the refractive members described above.

According to the present invention described above, it is possible to reduce the difference between the advancing path of the reflected light and the advancing path of the transmitted light, thereby obtaining a high-quality stereoscopic image.

In addition, it is possible to reduce the distances between the elements of the stereoscopic image device compared with a conventional stereoscopic image device, thereby reducing the overall size of the stereoscopic image device.

INDUSTRIAL APPLICABILITY

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

The invention claimed is:

1. A stereoscopic image device comprising:
a first polarizing beam splitter for reflecting light incident along a first path in a first direction and a second direction and transmitting the light in a third direction based on polarization components of the light, the light incident along the first path being image light;
a first reflective member for reflecting the light reflected by the first polarizing beam splitter to a screen;
a second polarizing beam splitter for reflecting light incident along a second path in the first direction and the second direction and transmitting the light in the third direction based on polarization components of the light, the light incident along the second path being image light; and
a second reflective member for reflecting the light reflected by the second polarizing beam splitter to the screen.

2. The stereoscopic image device according to claim 1, wherein the light incident along the first path or the light incident along the second path is continuously projected to form one selected from between a left image and a right image.

3. The stereoscopic image device according to claim 1, further comprising:
a first retarder for converting a polarization component of the light transmitted through the first polarizing beam splitter; and a second retarder for converting a polarization component of the light reflected by the second polarizing beam splitter in the first direction and the second direction.

4. The stereoscopic image device according to claim 3, wherein the first retarder and the second retarder are half wave retarders.

5. The stereoscopic image device according to claim 1, further comprising:
a first retarder for converting a polarization component of light transmitted through the second polarizing beam splitter; and
a second retarder for converting a polarization component of the light reflected by the first polarizing beam splitter in the first direction and the second direction.

6. The stereoscopic image device according to claim 5, wherein the first retarder and the second retarder are half wave retarders.

7. The stereoscopic image device according to claim 1, further comprising:
a first clean-up polarizer for improving a polarization state of the light transmitted through the first polarizing beam splitter and the light reflected by the first polarizing beam splitter and the first reflective member; and
a second clean-up polarizer for improving a polarization state of the light transmitted through the second polarizing beam splitter and the light reflected by the second polarizing beam splitter and the second reflective member.

8. The stereoscopic image device according to claim 1, further comprising:
a first half wave retarder for converting a polarization component of one selected from between the light transmitted through the first polarizing beam splitter and the light reflected by the first polarizing beam splitter;
a first clean-up polarizer for improving a polarization state o the light having passed through the first half wave retarder and the other selected from between the light transmitted through the first polarizing beam splitter and the light reflected by, the first polarizing beam splitter;
a second half wave retarder for converting a polarization component of one selected from between the light transmitted through the second polarizing beam splitter and the light reflected by the second polarizing beam splitter; and
a second clean-up polarizer for improving a polarization state of the light having passed through the second half wave retarder and the other selected from between the light transmitted through the second polarizing beam splitter and the light reflected by the second polarizing beam splitter.

9. The stereoscopic image device according to claim 1, further comprising:
   a first quarter wave retarder for converting the light transmitted through the first polarizing beam splitter and the light reflected by the first polarizing beam splitter and the first reflective member, which are first linear polarizations, into circular polarizations; and
   a second quarter wave retarder for converting the light transmitted through the second polarizing beam splitter and the light reflected by the second polarizing beam splitter and the second reflective member, which are second linear polarizations, into circular polarizations, wherein
   the light having passed through the first quarter wave retarder and the light having passed through the second quarter wave retarder are circular polarizations having different directions.

10. The stereoscopic image device according to claim 1, further comprising:
   a first half wave retarder for converting a polarization component of one selected from between the light transmitted through the first polarizing beam splitter and the light reflected by the first polarizing beam splitter;
   a first quarter wave retarder for converting the light having passed through the first half wave retarder and the other selected from between the light transmitted through the first polarizing beam splitter and the light reflected by the first polarizing beam splitter into circular polarizations having a first direction;
   a second half wave retarder for converting a polarization component of one selected from between the light transmitted through the second polarizing beam splitter and the light reflected by the second polarizing beam splitter; and
   a second quarter wave retarder for converting the light having passed through the second, half wave retarder and the other selected from between the light transmitted through the second, polarizing beam splitter and the light reflected by the second polarizing beam splitter into circular polarizations having a second direction.

11. The stereoscopic image device according to claim 1, wherein
   the light reflected in the first direction and the light reflected in the second direction have the same polarization direction,
   each of the first and second polarizing beam splitters comprises one side part for reflecting some of the incident light in the first direction and the other side part for reflecting some of the incident light in the second direction, and
   the one side part and the other side part are connected to each other such that the one side part and the other side part are inclined so as to face different directions.

12. The stereoscopic image device according to claim 1, wherein
   the first reflective member comprises a pair of first reflective members for reflecting the light reflected by the first polarizing beam splitter in the first direction and the second direction to the screen, and
   the second reflective member comprises a pair of second reflective members for reflecting the light reflected by the second polarizing beam splitter in the first direction and the second direction to the screen.

13. The stereoscopic image device according to claim 12, further comprising:
   a pair of first refractive means for decreasing a divergence angle of the light reflected by the first reflective members; and
   a pair of second refractive means for decreasing a divergence angle of the light reflected by the second reflective members.

14. The stereoscopic image device according to claim 12, further comprising:
   a first refractive means for increasing a divergence angle of the light transmitted through the first polarizing beam splitter; and
   a second refractive means for increasing a divergence angle of the light transmitted through the second polarizing beam splitter.

15. The stereoscopic image device according to claim 1, further comprising first and second light refractive members disposed in a direction in which light to be incident upon the first and second polarizing beam splitters advances for refracting the light to be incident upon the first and second polarizing beam splitters to prevent the light from being incident upon dimming areas formed in the first and second polarizing beam splitters.

16. The stereoscopic image device according to claim 1, wherein the first and second polarizing beam splitters are formed on surfaces of first and second prisms.

* * * * *